June 18, 1929.  H. E. BREY  1,717,757
STEERING CONTROL FOR ENDLESS TRACTION CRANES
Filed May 10, 1924  3 Sheets-Sheet 3
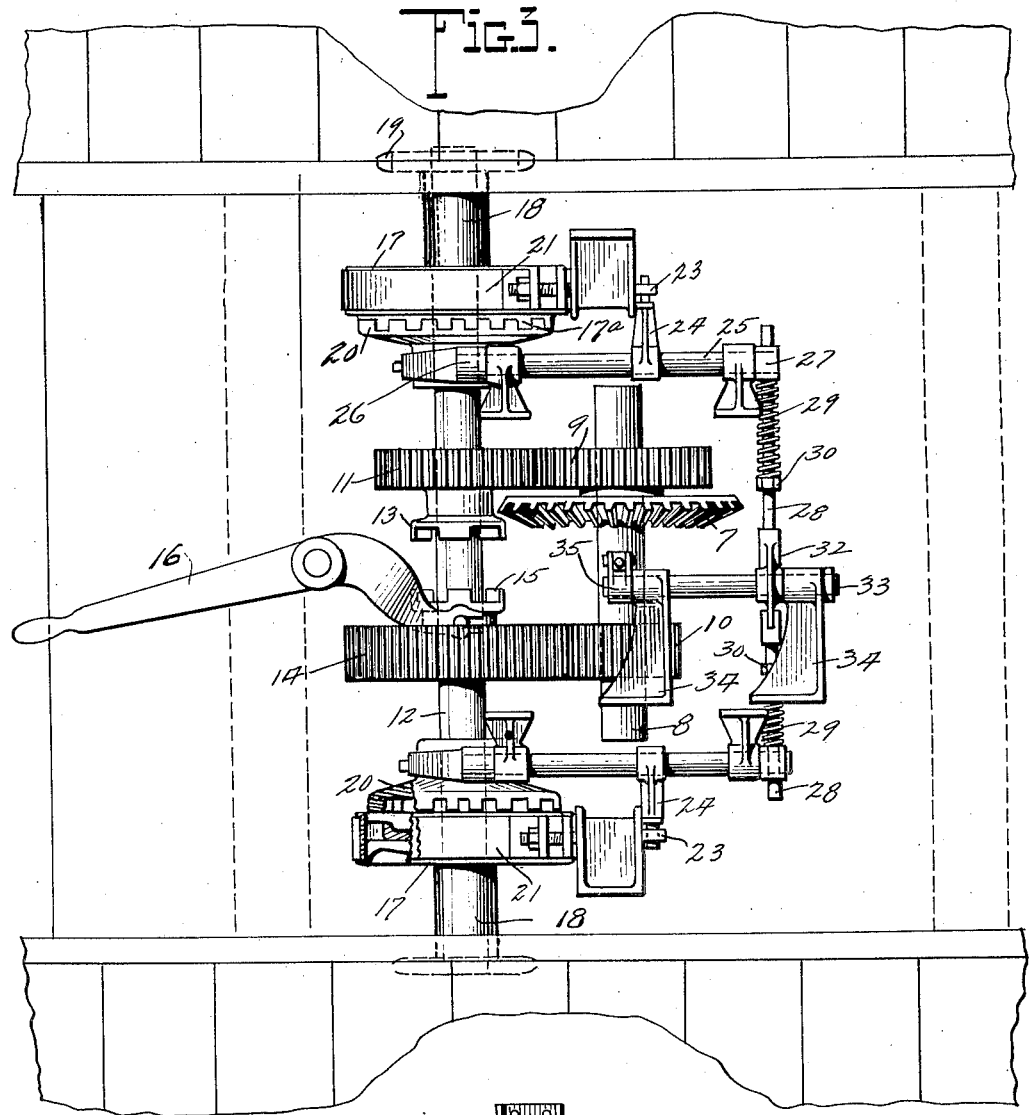
Inventor
Harold E. Brey
Witness
C. H. Wagner Patented June 18, 1929.

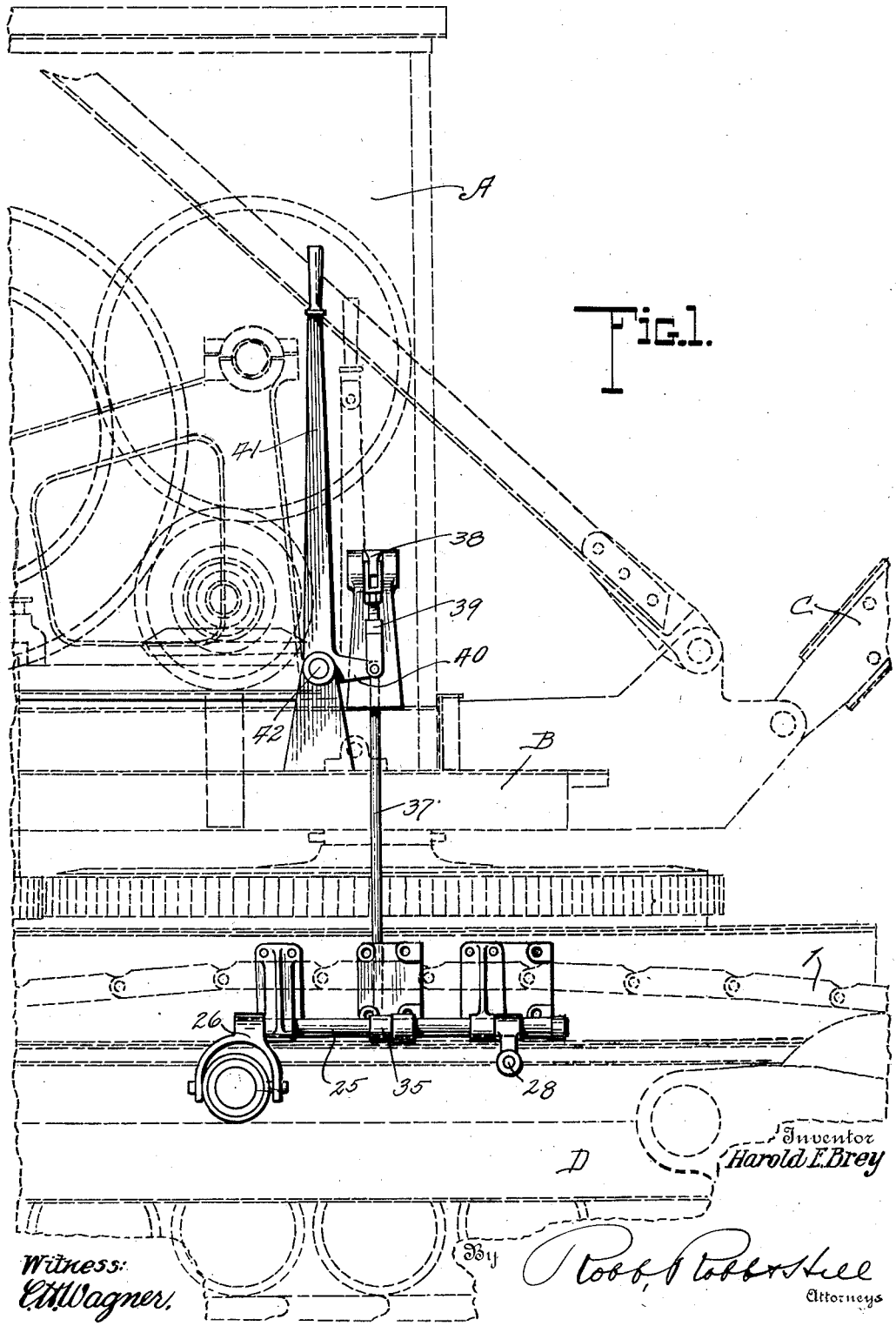

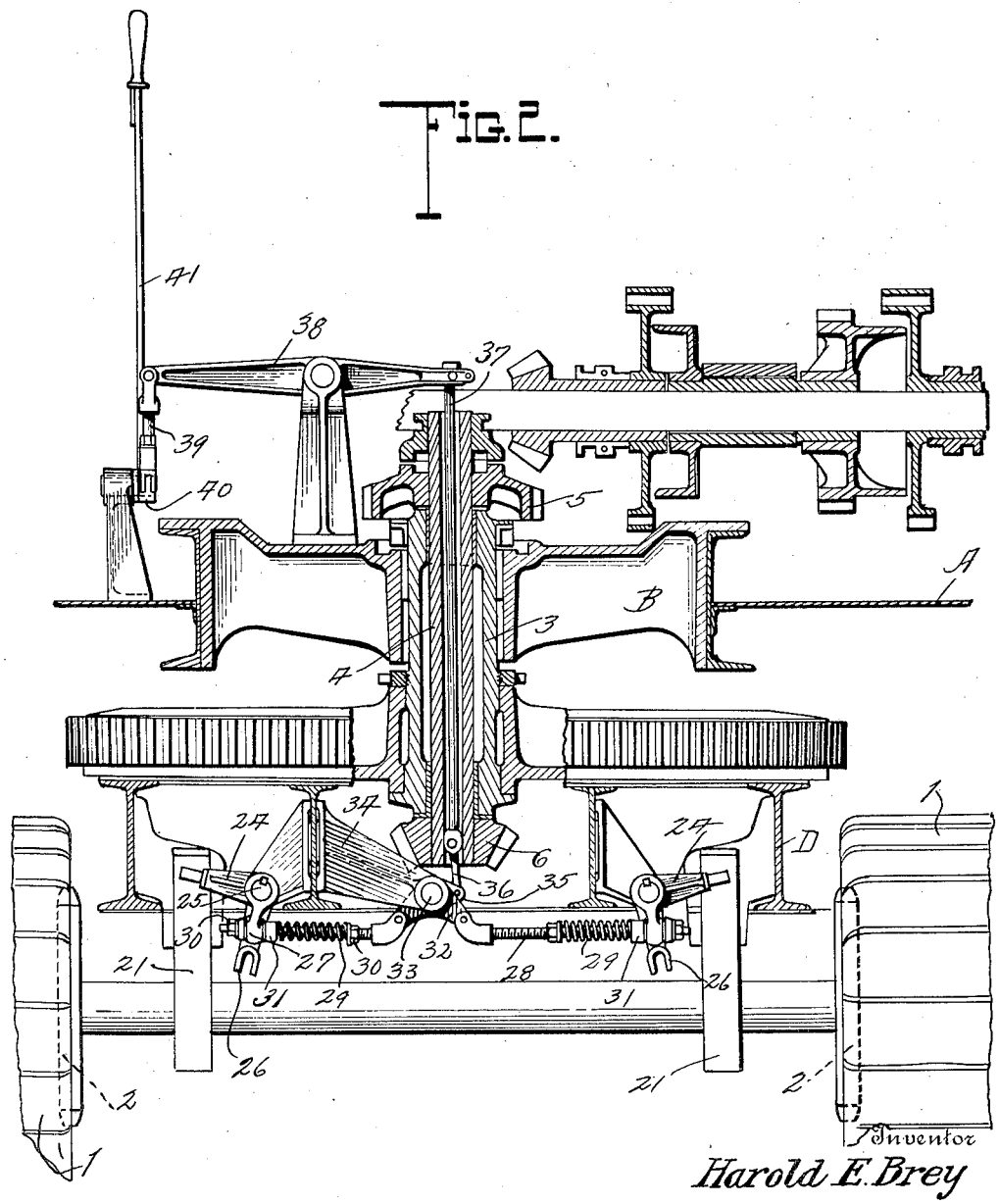

1,717,757

UNITED STATES PATENT OFFICE.

HAROLD E. BREY, OF MILWAUKEE, WISCONSIN, ASSIGNOR TO KOEHRING COMPANY, OF MILWAUKEE, WISCONSIN, A CORPORATION.

STEERING CONTROL FOR ENDLESS TRACTION CRANES.

Application filed May 10, 1924. Serial No. 712,495.

This invention has to do with traction control means of portable cranes. Such cranes today generally employ endless traction members by which the machine is propelled and by which the machine may be steered. The steering is ordinarily effected by discontinuing the drive on the endless traction device at one side of the machine while the other device is driven. Means of this general type, for steering, have been proposed by others and are disclosed for example by U. S. patent of Holt 1,008,338 of November 14, 1911.

The present invention proposes certain novel brake and clutch devices cooperative with the endless traction devices or members supporting a crane, whereby to lock either of such members or devices to a driven part for actuating the same, or to brake either one of said devices for compelling a discontinuance of its operation. The mechanism of the invention proposes control means for said parts operating through the center pin axis of the turntable or body of the machine.

The present invention also involves novel gear mechanism, with clutch devices, for controlling a two speed operation of the machine, the gears forming a part of the driving mechanism for the endless traction members.

In the accompanying drawings:

Figure 1 is a side elevation of a crane showing more clearly the control devices for the brake and the clutch mechanism controlling the endless traction members, the body of the crane and its traction base, being illustrated in dotted lines.

Figure 2 is a sectional view showing more clearly the center pin driving mechanism for the traction members and the control parts for the brake and clutch means governing the action of said members.

Figure 3 is a view looking down on the traction base of the machine and showing clearly the drive gearing for the traction members, the coacting brake and clutch control means, and the two speed control lever, with other parts.

Figure 4 is a detailed view showing more clearly the mounting of the brake-band one of which cooperates with each traction member.

The crane somewhat diagrammatically illustrated in the drawings comprises the car or body A mounted on the turntable B, and having the usual cable driving drums for the cables which operate whatever boom apparatus is used on the crane, the boom being partially shown at C in Figure 1. The turntable B and body A are supported in very much the conventional manner by a traction base D upon which are mounted in any suitable way the endless traction members 1 having the driving tumblers 2. The center pin axis 3 for the turntable B is hollow as usual and contains a hollow driving shaft 4 which carries at its upper end a gear 5 adapted to be driven from the power plant mounted on the body A. At its lower end the shaft 4 has the bevel gear 6 adapted to engage and drive a corresponding bevel gear 7 mounted on a jack shaft 8 supported in suitable bearings carried by the frame of the traction base D. The jack shaft 8 has keyed thereto a high speed gear 9 and a low speed gear 10, as well as the gear 7 aforesaid. The gear 9 is in constant mesh with a transmitting gear 11 loosely mounted upon the traction driving shaft 12, and the gear 11 is provided with a jaw clutch 13. Also mounted on the shaft 12 is a transmitting gear 14 which is provided with an internal jaw clutch 15, and which is splined to the shaft 12 so that it may be shifted from a relation seen in Figure 3, wherein it is meshed with the gear 10, to a different relation wherein its jaw clutch 15 is engaged with the jaw clutch 13, and the gear disengaged from the gear 10. A lever 16 is utilized to operate the jaw clutch 15 and the gear 14 of which it forms a part, said lever 16 being adapted to project from the rear end of the crane, or front end, if desired, and to be manually operated by a person standing at such end.

The traction shaft 12 is primarily a supporting shaft, in its relation to certain brake and clutch devices now to be described. A brake and clutch set is located at each end of the shaft 12 and comprises a brake drum 17 fixed to a sleeve 18 which is integral with the driving sprocket 19 that is adapted to be connected by a sprocket chain with the adjacent driving tumbler 2 of the adjacent traction member 1. The brake drum 17 is formed with a jaw clutch 17ª which jaw clutch is adapted to be engaged by the jaw clutch 20 carried by the shaft 12 and splined thereto, so as to move longitudinally of the shaft, 12. I use means for operating the clutch 20 and the brake band 21 which surrounds the drum 17, simultaneously, in order to apply the brake band 21 to the drum 17 as I disengage the clutch 20 from the clutch 17ª, and vice versa. The brake band 21 is applied by the use of toggle mechanism 22 shown in Figure 4, said mechanism including a slotted member 23 engaged by an arm 24 on a rock shaft 25 adjacent to the traction member controlled by the clutch and brake parts just mentioned. The rock shaft 25 carries the clutch shifting arm 26 by which the clutch 20 is operated, and the shaft 25 as seen in Figure 2 has an arm 27 projecting downwards therefrom which arm is resiliently connected by a connection comprising a rod 28, spring 29 and suitable attaching nuts 30 and a collar 31, with a double rocker arm 32. The rocker arm 32 is carried by a rock shaft 33 suitably journaled in bearing brackets 34, see Figure 3 and Figure 2. The rocker arm 32, which is a double armed lever virtually, is attached by one of its arms to move the shaft 25 operating the brake and clutch devices for one of the traction members 1 at one side of the machine. The various brake and clutch members called a brake and clutch set are duplicated, as before described, for the other one of the traction members 1 at the opposite side of the machine, and the intermediate connections are likewise duplicated so that in effect both arms of the rocker lever 32 are connected to the opposite brake and clutch sets comprising the parts 17, 21, 20, 17ª, 25, 27, 29, 30, 28 and 31.

My purpose in providing the resilient connections 28—29, is to permit the operation of a main control lever to actuate the rod 28 of each set aforesaid to force the clutch 20 into engagement with the clutch 17ª, whether the jaws or teeth of the two clutches are ready to mesh or interengage or not. If they are not ready to mesh the clutches will be engaged at the ends of the teeth and the spring 29 will be compressed and as soon as the parts 17ª and 20 have rotated relatively sufficient to permit their interengagement, such action will take place under the influences of the compressed springs 29.

On the shaft 33 is an arm 35 which extends beneath the opening through the hollow center driving shaft 4 and said arm is connected at said point by a link 36 with an operating rod 37 that passes downwards to a point of connection with said link, extending through, or being mounted in the hollow portion of the driving shaft 4. At its upper end the rod 37 is connected with a lever 38 attached by linkage 39 to the arm 40 projecting laterally from the lower end of the main control lever 41. The lever 41 is pivoted on the turntable or body of the crane at 42 and is adapted to assume four position to which it may be moved and held by means of any ordinary locking segment, locking dog, or ratchet mechanism.

The operation of my invention as thus far set forth may be simply described as follows: Assuming that the parts are in the positions of Figure 3 it will be noted that the clutches 20 and 17ª at the opposite sides of the machine are interengaged and the drive on the traction members 1 will be transmitted thereto to drive them at equal speeds by rotation of the jack shaft 8, driving gear 10 thereon operating the driven gear 14 which is splined to the shaft 12 so as to turn the latter. The turning of the shaft 12 drives both of the clutches 20 which are splined thereto and by this means the clutches 17ª, brake drum 17, sleeves 18, sprockets 19, and driving tumblers 2 are operated. The traction members 1 may thus be driven at relatively low speed in either direction, if some clutch mechanism is provided by which to turn the hollow drive shaft 4 in either direction. No such clutch mechanism as last mentioned is illustrated but same is well known in the art.

Suppose that it is desired to turn the machine to the right according to Figure 3 and assume that the lever 16 is at the rear end of the machine. To do this the operator will throw the control lever 41 into a position wherein the shaft 33 is rocked to throw out the clutch 20 at the right hand side of the machine to disengage it from its cooperating clutch member 17ª, and simultaneously the cooperating brake band 21 will be applied to the right hand drum 17. In this operation the clutch and brake set at the left hand side of the machine is undisturbed. The drive is therefore continued on the left hand traction member 1, and the drive is discontinued on the right hand traction member 1, and said right hand traction member 1 is held stationary by the brake band 21 applied as above set forth. As a consequence, the continued drive on the left hand traction member 1 turns the machine to the right.

It will be evident that by reversing the operation just above set forth through a new adjustment of the main control lever 41 the machine may be caused to turn to the left, the left hand traction member 1 being braked at the time its drive is discontinued, and the right hand traction member 1 continuing to drive as before. Thus far three adjustments of the lever 41 have been disposed of in this description.

The low speed drive gearing comprising the shaft 8 and gears 10 and 14 is preferably used for the ordinary movement of the crane when at work. It is desirable, however, to move the crane at a higher speed when shifting same from place to place, or locations rather remote from one another, when a high degree of portability is advantageous.

While the low speed gearing aforesaid is being used the gears 9 and 11 are operating practically idle. When the higher speed drive on the traction members 1 is desired to be used an operator at the rear of the machine will grasp the lever 16, while he stands on the ground, and shift the gear 14 and its clutch 15 until the clutch 15 engages the clutch 13. Under these conditions the gears 10 and 14 are disengaged and the drive is carried from the jack shaft 8 through the gears 9, 11, and 14 to the shaft 12, and will then be transmited to the driving sprockets 19 by operation of the clutch members 20 and 17ª in the manner presented before. As clearly seen in Figure 4, each of the brake bands 21 is especially adapted to be actuated by the swing of the respective arm 24 in either direction with equal efficiency, the linkage connection being such as to exert a closing pull upon both ends of the brake band in a manner to prevent backlash, or tendency toward backlash, of the drum 17 in either direction. This is of importance in view of its combinative effect in the operation of the clutching and clutch release parts, which are susceptible of effective action in either direction.

Having thus described my invention, what I claim as new and desire to secure by Letters Patent is:

1. In mechanism of the class described, in combination, a traction base comprising traction members, a turntable on said base, a driving mechanism for said traction members including a jack shaft, a traction driving shaft, gearing intermediate said shafts, a clutch and brake set for each of the traction driving members, the clutch and brake of each set being alternately operative, and a single control device on said turntable operatively connected with said clutch and brake sets whereby to disengage a clutch and apply the brake of either set, and means controlled by each clutch and brake set for transmitting driving and braking forces to an associated one of the traction members, the gearing between the jack shaft and traction driving shaft comprising sets of gears of different gear ratios for transmitting movement from the jack shaft to the driving shaft, and means located on the base for rendering either of said sets of gears operative.

2. In driving and steering mechanism of the class described, in combination, a traction base, a driving shaft, traction driven means on said driving shaft at each side of said base, a set of clutch and brake elements for controlling each of said driving means, a pair of parallel operating shafts for the clutch and brake elements, an intermediate shaft, actuating connections between the operating shafts and the intermediate shaft to positively operate one of said clutch or brake elements of the respective sets and simultaneously yieldably operate the other of said elements of the other set when the intermediate shaft is actuated in one direction, and when moved in the other direction to produce a corresponding shifting of the previously inactive clutch and brake elements of the respective sets.

3. In a crane, in combination, a crane body, a traction base therefor comprising spaced endless traction members, a rotative connection between the crane body and said traction base, clutch and brake sets on the traction base, the clutch of each set being operable alternatively with respect to its brake, the clutch to drive a coacting traction member, and the brake to apply braking force to said member, and means on the crane body operatively connected with the clutch and brake sets for controlling the operation as specified, said means including connections located at the axis of rotation of the crane body with respect to the traction base, said connections comprising members resiliently connected with the clutches of the two sets and arranged to operate the brakes of the two sets in alternation with the clutches as set forth, and driving means for the clutch devices of the clutch and brake sets, comprising a traction driving shaft, brake drums with which the brakes are adapted to cooperate and with which the clutches are adapted to cooperate, traction driving sprockets connected with said brake drums.

4. In a crane, in combination, a crane body, a traction base therefor comprising spaced endless traction members, a rotative connection between the crane body and said traction base, clutch and brake sets on the traction base, the clutch of each set being operable alternatively with respect to its brake, the clutch to drive a coacting traction member, and the brake to apply braking force to said traction member, and means on the crane body operatively connected with the clutch and brake sets for controlling the operation as specified, said means including connections located at the axis of rotation of the crane body with respect to the traction base, said connections comprising members resiliently connected with the clutches of the two sets and arranged to operate the brakes of the two sets in alternation with the clutches as set forth, and driving means for the clutch devices of the clutch and brake sets, comprising a jack shaft, a traction driving shaft, brake drums with which the brakes are adapted to cooperate, traction driving sprockets connected with said brake drums, and gearing intermediate said jack shaft and said traction driving shaft, said gearing involving two gear sets of different gear ratios for driving the traction driving shaft at different velocities, and means including a manual device for rendering operative either of said gear sets.

5. In crane driving and steering mechanism, in combination, a traction base, traction driving means at each side thereof, a driving shaft mounted on said base, the traction driving means comprising combined brake and clutch elements supported by said shaft and having connection with traction driving parts supported by said shaft, the clutch and brake elements being arranged in sets, one set adjacent to each end of the driving shaft and the said sets being loose upon the driving shaft, clutch members mounted to turn with the driving shaft, one clutch member for each set of clutch and brake elements, a brake associated with each set of clutch and brake elements and adapted for effective action when the associated clutch is rendered inactive, and means to operate the sets of clutch and brake elements comprising parallel operating shafts extending rectilinearly from the driving shaft, a member carried by each one of said parallel shafts connected with the clutch of an associated set aforesaid, a separate member on each operating shaft connecting the same with the brake of the associated set aforesaid, and a single means operatively connected with the parallel operating shafts for actuation of the same to cause application of the clutches of the respective sets at the same time, and to cause the clutch element of one set to be applied whilst the clutch element of the other set is unapplied, and to control application of the brake of one set when the clutch thereof is released.

6. In crane driving and steering mechanism, in combination, a traction base, a driving shaft on said base, traction members for operation thereby, driving connections between the traction members and the ends of the operating shaft each including a combined brake and clutch drum loose on the shaft and having a sleeve rigid to turn therewith, and a traction driving gear on said sleeve, clutch members mounted to turn with the shaft and associated with the said brake and clutch drums, brakes cooperating with the brake surfaces of the brake and clutch drums, and operating means to actuate the brake and clutch members associated with each of the brake and clutch drums including parallel operating shafts leading away from the driving shaft at right angles thereto, arms on each operating shaft connected with the brake and clutch members associated with an adjacent one of the clutch and brake drums, said arms being so arranged that when the brake member is applied to said drum the clutch member will be released and vice versa, and a single control means for causing operation of the said operating shafts so as to cause engagement of both of the clutches with both of the clutch and brake drums at one time, and to cause engagement of either one of the said clutches with the associated brake and clutch drum.

7. In crane driving and steering mechanism, in combination, a traction base, a driving shaft on said base, traction members for operation thereby, driving connections between the traction members and the ends of the operating shaft each including a combined brake and clutch drum loose on the shaft and having a sleeve rigid to turn therewith, and a traction driving gear on said sleeve, clutch members mounted to turn with the shaft and associated with the said brake and clutch drums, brakes cooperating with the brake surfaces of the brake and clutch drums, and operating means to actuate the brake and clutch members associated with each of the brake and clutch drums including parallel operating shafts leading away from the driving shaft at right angles thereto, arms on each operating shaft connected with the brake and clutch members associated with an adjacent one of the clutch and brake drums, said arms being so arranged that when the brake member is applied to said drum the clutch member will be released and vice versa, and a single control means for causing operation of the said operating shafts so as to cause engagement of both of the clutches with both of the clutch and brake drums at one time, and to cause engagement of either one of the said clutches with the associated brake and clutch drum, a turntable mounted upon the traction base and supporting the single control means aforesaid in such a way that the latter may operate the operating shafts at any point in the rotation of the turntable, and the operating connections between the operating shafts and the clutch members including springs permitting the clutch members to be held out of engagement with the clutch parts of the brake and clutch drums until the interengaging portions of the two register.

8. In driving and steering mechanism for tractor type machines, in combination, a traction base, a driving shaft on said base, traction members for the base operable from the driving shaft, driving connections intermediate the traction members and the operating shaft and comprising two separate combination brake and clutch drums loosely mounted upon the driving shaft, a sleeve projecting from each brake and clutch and rotatable therewith and receiving the driving shaft, a traction driving gear member carried by said sleeve for operating the traction members aforesaid, separate and independently movable clutch members carried by the driving shaft and secured for rotation therewith and each cooperative with the clutch part of an associated combination brake and clutch drum aforesaid, gearing for operating the driving shaft and control means having connections with the clutch members secured to the driving shaft for imparting to said clutch members movements to connect both of them with the combination brake and clutch drums for driving the traction members at the same time, said control means and its connections being operable to engage either of the clutch members secured to the driving shaft with its associated brake and clutch drum, and brake means operable by said connections and associated with each of the brake and clutch drums and adapted to be applied thereto at a predetermined point in the operation of the adjacent associated clutch secured to the driving shaft.

In testimony whereof I affix my signature.

HAROLD E. BREY.